Aug. 21, 1928.
O. C. STROTH ET AL
1,681,505
NUT COOKING MACHINE
Filed April 29, 1927    2 Sheets-Sheet 2
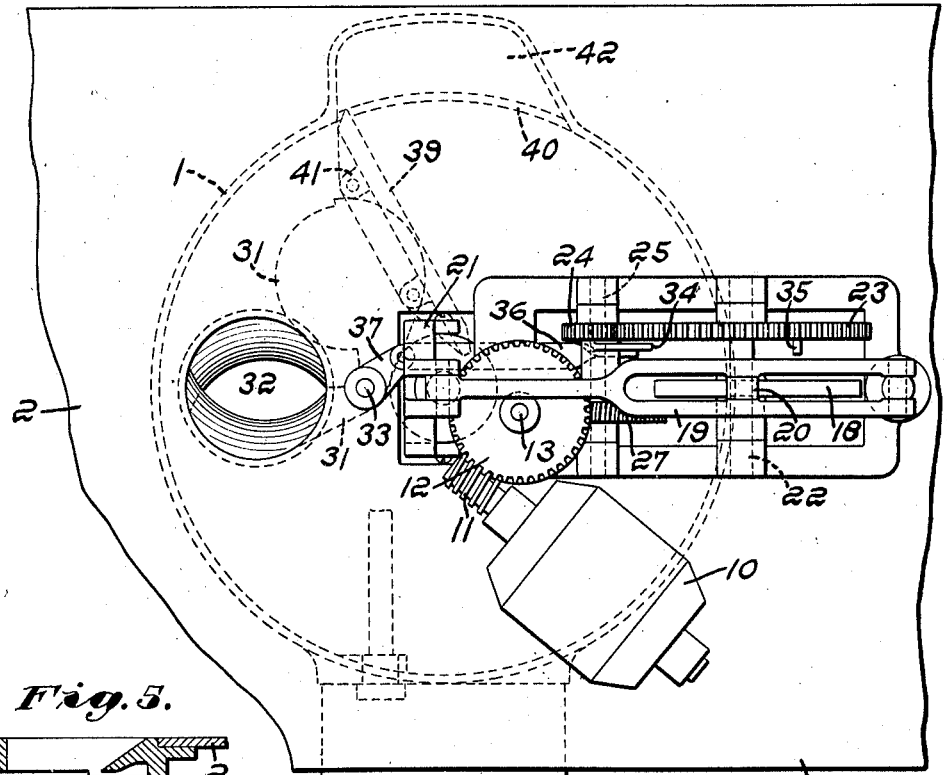
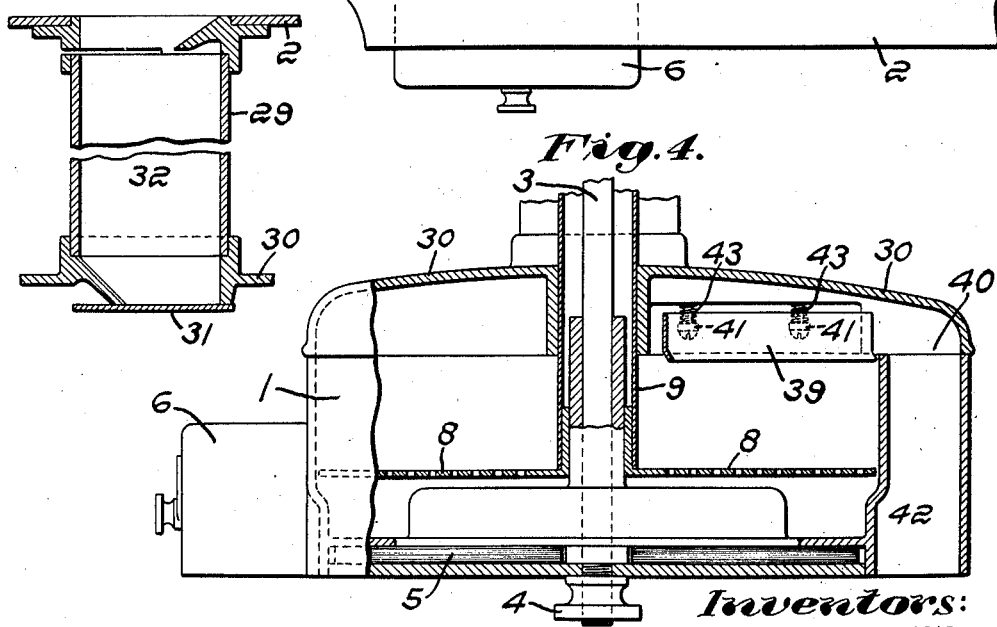

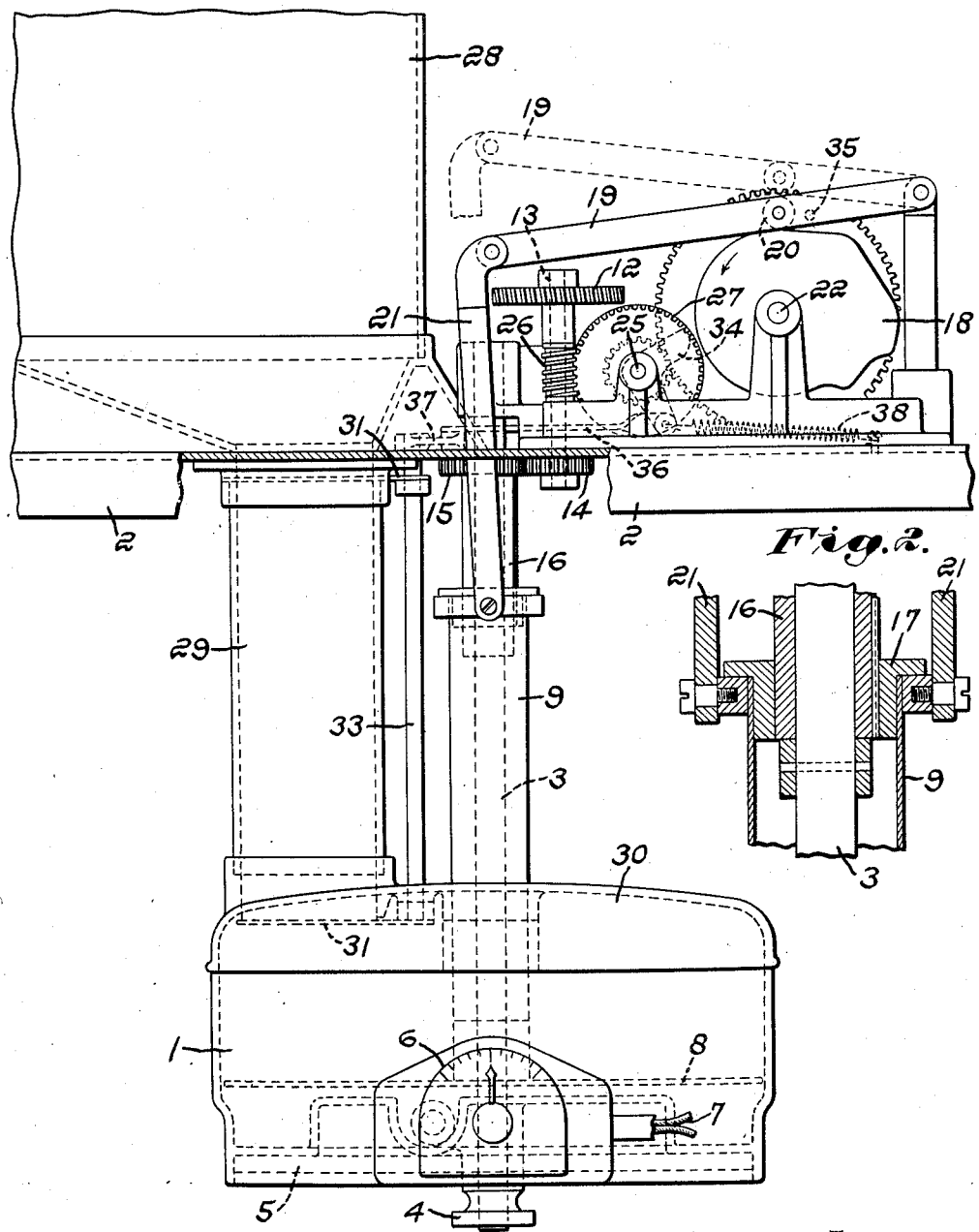

Patented Aug. 21, 1928.

1,681,505

UNITED STATES PATENT OFFICE.

OTTO C. STROTH AND PAUL R. LEMPKE, OF DOVER, NEW HAMPSHIRE.

NUT-COOKING MACHINE.

Application filed April 29, 1927. Serial No. 187,686.

The invention relates to improvements in machines for cooking nuts in oil, and the principal object thereof is to provide a machine of this type which is so designed that it can be constructed and sold for a comparatively small sum, and which will run automatically without easily getting out of order.

In the drawings:—

Fig. 1 is a view of our machine in elevation;

Fig. 2 is a detail in enlarged section;

Fig. 3 is a top plan view; and

Figs. 4 and 5 are other detail sections.

The container 1 in which the nuts are cooked is suspended from a table or support 2 by a vertical rod 3 to which it is removably secured by a thumb screw 4. This container is adapted to hold oil for cooking the nuts and is electrically equipped for heating the oil, the numerals 5, 6 and 7 denoting respectively the heating element, thermostat and the lead cords.

Inside the container chamber is a perforated disk 8 for supporting the nuts while they are being cooked, said disk being mounted for rotation by being made fast to the end of a tubular shaft 9 through which the rod 3 extends. This shaft is rotated by a motor 10 through a worm 11, a gear 12 on a countershaft 13, and gears 14 and 15, the latter being fast on a hollow shaft 16 journalled on the upper part of rod 3 and splined to a plug 17 fitted tightly into the upper end of said tubular shaft.

The tubular shaft is not only mounted for rotation but has a longitudinal movement along the rod 3, this movement being controlled and timed by a cam 18 suitably mounted on the table 2 and operatively connected with the tubular shaft by a forked-lever 19 having a roller 20 which bears upon the cam, and a yoke 21, the forked end of which embraces the plug 17 to which it is pivoted (Fig. 2). The cam is driven through its shaft 22, which carries a gear 23 meshing with a gear 24 on a counter-shaft 25 which, in turn is driven by the motor through shaft 13, a worm 26 thereon, and a gear 27 on shaft 25 which meshes with said worm.

For supplying and delivering nuts to the container 1 to be cooked, a hopper 28 is provided on the table 2 which terminates in a chute 29 which, in turn, delivers through the container cover 30 so that the nuts are received upon the rotating disk 8. At the upper and lower ends of the chutes are cut-off slides 31 so located in the chute relatively to each other that the area of space 32 within the chute between said slides may be used as a measure for determining the exact amount of nuts to be admitted to the inner chamber for each charge. These slides are secured to a rock-shaft 33, one at each end, and are so related that when one is in position to check the flow of nuts, the other will be swung out from the chute, so that the space 32 in the chute will be alternately filled and emptied (Figs. 1, 3 and 5).

The shaft 33 is rocked in one direction by a bell-crank 34 loose on shaft 25, one arm of which is actuated at the proper moment by a pin 35 on gear 23 and which, through a slide 36 and a crank-arm 37, turns the shaft 33 sufficiently to swing the upper slide 31 into its cutting-off position, at the same time moving the lower slide from its cutting-off position to its open position, whereupon a charge of nuts is delivered from the chute into the cooking chamber and onto the rotating disk 8. As soon as the pin 35 has passed beyond the actuated arm of the bell-crank, the latter is pulled back into its first position by a spring 38, thus restoring, through slide 36 and arm 37, the rock shaft 33 to its original position with the lower slide acting to check the nuts and the upper slide swung out from the chute; and in this position the chute will again fill up with nuts ready to be delivered into the cooking chamber upon the next actuation of the bell-crank.

When the nuts are delivered into the cooking chamber, they are circulated through the cooking oil by the rotating disk for a predetermined time, then the cam, operating through its connections with the tubular shaft, raises the latter and causes the disk and the nuts thereon to be lifted out of the oil which drains back through the perforations in the disk while the latter, still rotating, carries all of the nuts against a blade 39 mounted on the cover of the container, whereby said nuts are directed into the opening 40 of a delivering chute 42. Said blade is yieldingly held against the cover of the container by having springs 43 interposed between the securing lugs 41 on the blade and said cover so that when the disk is raised and the nuts are brought into contact with the blade, no nuts will be jammed between the blade and disk.

It will be noted that the circulation of nuts in the oil for cooking, conducted as it is by the continuously rotating disk, is uniform and regular and that its rate of rotation is not dependent upon the cam as in some other nut cooking machines where the cam, or timing mechanism, controls a cooking drum which rotates on a horizontal axis. In the latter type of apparatus, the movement of the drum is necessarily very slow, since one revolution thereof constitutes one complete cycle of operations and the drum must move slowly enough to permit the nuts to be cooked while being carried through the oil. Consequently, it is usual to provide a Geneva wheel to produce intermittent movement of the drum to get the slow speed required.

The present invention, by making the circulation of the nuts independent of the cycle of operations, makes a Geneva wheel unnecessary and therefore considerably simplifies the apparatus.

We claim as our invention:

1. In a nut cooking machine, the combination with nut-cooking, nut-feeding and nut delivery means, of a shaft, a disk secured thereto adapted to receive the nuts to be cooked from the feeding means and to support them while subject to the cooking means, means to rotate said shaft, and time-controlled means for raising said shaft to deliver the nuts from the disk to the delivery means.

2. In a nut cooking machine, the combination of a vertical shaft, a perforated disk secured thereto, a container in which the disk rotates, means to rotate said shaft, means to raise and lower said shaft, and timing mechanism for the latter named means.

3. In a nut cooking machine, the combination with nut-cooking, nut-feeding and nut delivery means, of a shaft, a disk secured thereto adapted to receive the nuts to be cooked from the feeding means and to support them while subject to the cooking means, means to rotate said shaft, and a yieldingly mounted blade to cooperate with the rotating disk when the shaft is raised to direct the nuts into the delivery means.

4. In a nut cooking machine, the combination with nut-cooking, nut-feeding and nut delivery means, of a shaft, a disk secured thereto adapted to receive the nuts to be cooked from the feeding means and to support them while subject to the cooking means, means to rotate said shaft, and a blade adapted to cooperate with the rotating disk when the shaft is raised to direct the nuts into the delivery means.

In testimony whereof, we have signed our names to this specification.

OTTO C. STROTH.
PAUL R. LEMPKE.